Patented Apr. 30, 1946

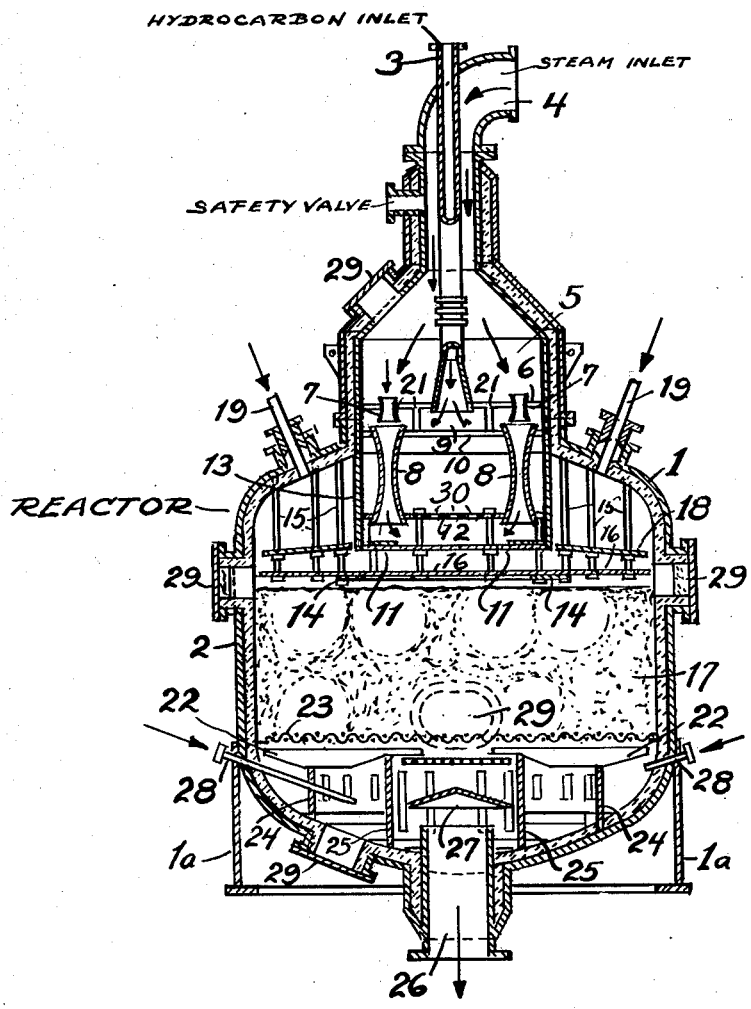

2,399,560

UNITED STATES PATENT OFFICE 2,399,560

APPARATUS FOR PRODUCTION OF OLEFINS AND DIOLEFINS

Eger V. Murphree, Summit, N. J., assignor to Standard Oil Development Company, a corporation of Delaware Original application May 2, 1942, Serial No. 441,438. Divided and this application February 18, 1943, Serial No. 476,269

7 Claims. (Cl. 23—288)

This is a division of application Serial No. 441,438, filed May 2, 1942.

The present invention pertains to a process of converting hydrocarbon vapors and gases to olefins and diolefins, and an apparatus for carrying out this process.

It is an object of this invention to provide a novel and highly advantageous method of dehydrogenating hydrocarbon vapors and gases to olefins and diolefins, and particularly to provide a method of dehydrogenating butylene to butadiene.

It is a further object of this invention to provide a novel method of dehydrogenating butylene to butadiene by mixing butylene with superheated steam, passing the resultant mixture through a catalyst zone, and rapidly quenching the reaction mixture immediately after leaving the catalyst zone.

It is also an object of this invention to provide the art with a novel reactor that is especially adapted for use in the production of olefins and diolefins from hydrocarbon gases and vapors and particularly for the production of butadiene from butylene.

These and other objects will be seen more clearly in the detailed description and claims which follow. Reference is made in this connection to the accompanying drawing which shows my novel reactor.

The figure shows the reactor in accordance with the present invention in vertical cross section.

The reactor comprises a shell 1, provided, if desired, with a lining 2 of firebrick or the like. The reactor body is mounted on girders 13 or on any other suitable support. An inlet pipe 3 is provided at the top of the reactor for introducing the hydrocarbon into the reactor. A steam inlet 4 is also provided at the top of the reactor, and as shown, may surround the butylene inlet pipe. The steam introduced through inlet 4 is confined in the header 5 at the top of the reactor by the plate 6, and is permitted to pass from the header 5 through expanding nozzles 7 and the resulting jets discharge into the throats of co-acting Venturi tail pieces 8. In the preferred arrangement about ten nozzles are uniformly placed about a circle which is concentric with the hydrocarbon inlet pipe, although the specific arrangement of the nozzles and the number of them may be varied as desired. The nozzles and tail pieces could, for example, be individually mounted around the top of the reactor.

The inlet pipe 3 discharges into a chamber or header 9 formed by plate 6 and plate 10. The hydrocarbon is withdrawn from the chamber 9, through the tail pieces 8 by the injector action of the jets discharging from nozzles 7 at high velocity into the tail pieces 8. The hydrocarbon is thereby thoroughly and intimately mixed with the steam in a minimum of time. The jets of hydrocarbon and steam are discharged from the Venturi tail pieces 8 against baffle plates 11, or some similar means for distributing the reaction mixtures through the reaction chamber. As shown in the drawing, the tail pieces 8 may be supported at their lower ends in a plate 12, or the like. For convenience in manufacture and installation, the entire injection means may be constructed as an integral unit in a hollow cylinder 13, to which the plates 6, 10 and 12 can be secured in any suitable manner as by welding. The discharge end of the hydrocarbon inlet pipe, the nozzles and the tail pieces are secured to the respective header plates in any desired manner. The cylinder 13 and the parts assembled thereon may be supported in the top of the reactor either by securing it to the main reactor body or to a separable top section thereof, or it may be allowed to rest on the frame 14 which is suspended from the top of the main reactor body by hanger rods 15. A screen or orifice plate 16 is provided on the frame 14 in order to secure uniformity of distribution and to avoid displacement of the catalyst particles from the top of the catalyst bed 17 by the introduction of the mixture of steam and hydrocarbon. Baffle plates 18 may also be provided on frame 14 in order to prevent the eddying or entrapment of part of the hydrocarbon-steam mixture in any space which may exist between the cylinder 13 and the wall of the reactor. In order further to prevent the accumulation of hydrocarbon in this space, steam connections 19 are provided which permit the introduction of a stream of steam sufficient to flush out this space. Also in order to prevent the entrance of butylene-steam mixtures into the chamber 20 surrounding tail pieces 8, a plurality of bleeder nipples 21 are provided which permit the passage of some steam directly from the header 5 into this space. The steam escapes from this space into the reaction chamber through holes 30 provided in plate 12.

The catalyst bed is supported on gratings 22 over which screens 23 of the necessary mesh to prevent loss of catalyst are placed. If so desired, a layer of inert material such as quartz, firebrick or the like may be placed on the screen in order to provide a further safeguard against the loss of catalyst material. The gratings 22, which are arranged radially, are supported on cylinders 24 and 25 which are perforated, as shown, to permit passage of the reaction mixture to the outlet 26. A baffle plate 27 of conical or any desired shape is arranged above the outlet and a plurality of connections 28 are provided around the base of the reactor in order that a spray of cooling fluid can be introduced into the reaction mixture at several points directly after leaving the catalyst bed, in order to quench the reaction mixture as uniformly as possible to such temperature as is deemed necessary to prevent degradation thereof. As shown in the drawing, several manheads 29 are provided in the reactor body to permit inspection and repair of the reactor. While the reactor is shown with the inlet at the top and a downward flow of reactant, the inlet could be just as well placed at the bottom of the reactor and the flow of reactant be upwards. It is also to be understood that the reactor could just as well be placed in a horizontal position.

In view of the thermal instability of the hydrocarbon at the temperatures at which dehydrogenation is effected, it is absolutely essential to keep the time interval during which the hydrocarbon is at reaction temperature prior to contact with the catalyst to a minimum. This is accomplished with a high degree of effectiveness by the present invention since the hydrocarbon introduced into the chamber 9 is preheated only to such temperature that it is stable; the heat necessary to bring it to reaction temperature being supplied by the superheated steam. The superheated steam undergoes an appreciable pressure drop in passing through jets 7 and 8, thereby acquiring a high velocity, so that the time interval during which the steam and the hydrocarbon picked up in the chamber 9 are in contact prior to reaching the catalyst zone is extremely short generally only a small fraction of a second.

The reaction mixture, particularly when it contains diolefins, is quite unstable at the temperatures at which it leaves the catalyst zone, and for this reason, it is desirable to reduce the temperature of the reaction mixture as rapidly as possible. The connections shown are extremely effective in reducing the temperature of the reaction gases, since water for example, introduced thereby is immediately vaporized and may easily be operated to reduce the temperature of the reaction mixture from about 1200 to 1300° F. to about 900 to 1100° F.

A typical operation of my apparatus is as follows:

Butylene is supplied to a reactor having an internal diameter of approximately 15 ft. and a catalyst bed 6 ft. deep through the inlet pipe preheated to a temperature of about 1000 to 1200° F., or slightly below the temperature necessary to effect dehydrogenation, at the rate of about 40,000 lbs. hour. Superheated steam at about 1300 to 1400° F. and under a pressure of about 40 lbs./sq. in. gauge is supplied to the steam inlet tube at the rate of 100,000 lbs./hour. The discharge of the steam through the jet 7 causes the pressure thereof to drop to about 10 lbs./sq. in. The steam jets discharging from the nozzles into the throat of the Venturi tail pieces act as aspirators and withdraw butylene from the chamber 9 and force it into the throat of the tail pieces 8 and thence into the catalyst zone. The pressure at the inlet of the catalyst zone is about 9 to 10 lbs./sq. in. and the pressure drops to about 5 lbs./sq. in. at the outlet of the reactor. The catalyst, which preferably has both dehydrogenation and water-gas activity may, for example, have the following composition:

| | Parts by weight |
|---|---|
| MgO | 78 |
| $Fe_2O_3$ | 20 |
| CuO | 5 |
| $K_2O$ | 2.5 |

The temperature in the catalyst zone is generally between about 1100 and 1300° F. The mixture of butylene and steam in the ratio by volume of 1 part of butylene to about 15 parts of steam, is passed through the catalyst zone at the rate of about 200–1000 cu. ft. of butylene (Standard Cond.) per hr. per cubic foot of catalyst. The time in which the reaction mixture is in contact with the catalyst bed is generally between about 0.05 and about 2.0 seconds. The exact rate of throughput is variable depending upon the character and age of the catalyst as well as the reaction temperature. The reaction mixture is rapidly quenched to approximately 1000° F. Analysis of the reaction mixture shows that about 25% of the butylene supplied is converted by passage through the reactor and of this, 78% is converted to butadiene.

It is obvious that other hydrocarbons may be dehydrogenated in accordance with the present invention, the optimum temperature, ratio of hydrocarbon and diluent and throughput for each material being readily determined. Thus butane can be converted to butylene, propane to propylene and pentanes to pentenes and pentadienes.

Due to some cracking of the initial material, there is a gradual accumulation of carbon and consequently a gradual diminution in the activity of the catalyst. Accordingly, it is desirable periodically to shut off the supply of hydrocarbon and pass superheated steam alone through the reactor in order to convert the deposited carbon to water-gas, and thereby revivify the catalyst.

While in the foregoing description steam has been described as the medium for heating the hydrocarbon to reaction temperature, it is to be understood that other inert diluent gases such as nitrogen or methane, can be used with equal effect. As a matter of fact, catalysts containing activated alumina which are sensitive to steam or water, require the use of an anhydrous inert diluent such as nitrogen.

Quenching fluids other than water may also be used. For example, a condensate of the present process or fractions of said condensate, preferably after recovery of the diolefin, can be used as a quenching medium. This is especially preferred when anhydrous diluents are used since it obviates the necessity of removing water from the diluent prior to its return to the process.

I claim:

1. A reactor comprising in combination a casing, a partition near one end of said casing forming a first chamber with the end of the casing, a second partition substantially parallel to said partition forming a second chamber therewith, a third chamber enclosed by said casing having a support arranged to receive a catalyst bed substantially filling the entire cross-section of the casing at a location beyond the second partition, a plurality of aspirating Venturi tubes having their suction inlets arranged in said second chamber, their pressure energizing openings arranged in said first chamber, and their discharge openings arranged in said third chamber, inlet means for said first and second chamber, and an outlet in that end of the third chamber opposite to the end in which the discharge openings of the Venturi tubes are located.

2. A reactor comprising in combination a casing, a partition near one end of said casing forming a first chamber with the end of the casing, a second partition substantially parallel to said partition forming a second chamber therewith, a third chamber enclosed by said casing having a support arranged to receive a catalyst bed substantially filling the entire cross-section of the casing at a location beyond the second partition, a plurality of aspirating Venturi tubes having their suction inlets arranged in said second chamber, their pressure energizing openings arranged in said first chamber, and their discharge openings arranged in said third chamber, inlet means for said first and second chambers, an outlet in that end of the third chamber opposite to the end in which the discharge openings of the Venturi tubes are located, and liquid spray means arranged beyond the catalyst bed for the supply of a quenching liquid for the reaction mixture leaving the catalyst bed.

3. A reactor comprising in combination a vertical substantially cylindrical casing, a horizontal partition near one end of said casing forming a first chamber with the end of the casing, a second horizontal partition forming a second chamber with said first partition, a third chamber enclosed by said casing having a support arranged to receive a catalyst bed substantially filling the entire cross-section of the casing at a location beyond the second partition, a plurality of separating Venturi tubes having their suction inlets arranged in said second chamber, their pressure energizing openings arranged in said first chamber, and their discharge openings arranged in said third chamber, inlet means for said first and second chambers, and an outlet in that end of the third chamber opposite to the end in which the discharge openings of the Venturi tubes are located.

4. A reactor comprising in combination a vertical substantially cylindrical casing, a horizontal partition near one end of said casing forming a first chamber with the end of the casing, a second horizontal partition forming a second chamber with said first partition, a third chamber enclosed by said casing having a support arranged to receive a catalyst bed substantially filling the entire cross-section of the casing at a location beyond the second partition, a plurality of aspirating Venturi tubes having their suction inlets arranged in said second chamber, their pressure energizing openings arranged in said first chamber, and their discharge openings arranged in said third chamber, inlet means for said first and second chambers, an outlet in that end of the third chamber opposite to the end in which the discharge openings of the Venturi tubes are located, and liquid spray means arranged beyond the catalyst bed for the supply of a quenching liquid for the reaction mixture leaving the catalyst bed.

5. The combination as defined in claim 4 in which baffle means are arranged opposite the discharge openings of the Venturi tubes to facilitate the distribution of the reaction mixture entering the catalyst bed.

6. A reactor comprising in combination a vertical substantially cylindrical casing, a horizontal partition near the upper end of said casing forming a first chamber with the top of the casing, a second horizontal partition forming a second chamber with said first partition, a third chamber enclosed by said casing having a foraminous support arranged to receive a catalyst bed substantially filling the entire cross-section of the casing at a location beyond the second partition, a plurality of aspirating Venturi tubes having their suction inlets arranged in said second chamber, their pressure energizing openings arranged in said first chamber and their discharge openings arranged in said third chamber, inlet means for the supply of a heated gaseous energizing agent under substantial pressure to said first chamber, inlet means for the supply of gaseous reagent to said second chamber, baffle means arranged opposite the discharge openings of the Venturi tubes to facilitate the distribution of the reaction mixture entering the catalyst bed, means for maintaining the foraminous support for the catalyst bed in spaced relation to the bottom of the casing, an outlet for the discharge of reaction products in the bottom of the casing and liquid spray means arranged between the foraminous support and the bottom of the casing for the supply of quenching liquid.

7. The combination as defined in claim 6 wherein a screen is arranged above the catalyst bed for preventing displacement of the catalyst particles.

EGER V. MURPHREE.